US012706454B2

(12) United States Patent
Castillo et al.

(10) Patent No.: US 12,706,454 B2
(45) Date of Patent: Aug. 11, 2026

(54) SHORT-CIRCUIT CURRENT CONTROL IN POWER SYSTEMS

(71) Applicant: Saudi Arabian Oil Company, Dhahran (SA)

(72) Inventors: Ricardo Jose Guerra Castillo, Dhahran (SA); Nabil El Halabi Fares, Dhahran (SA); Luis De Andrade De Freitas, Dhahran (SA); Ahmed Al-Shammari, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 221 days.

(21) Appl. No.: 18/475,936

(22) Filed: Sep. 27, 2023

(65) Prior Publication Data

US 2025/0105621 A1 Mar. 27, 2025

(51) Int. Cl.
*H02H 9/02* (2006.01)
*H02H 7/26* (2006.01)

(52) U.S. Cl.
CPC .............. *H02H 9/021* (2013.01); *H02H 7/26* (2013.01)

(58) Field of Classification Search
CPC ................................. H02H 9/021; H02H 7/26
See application file for complete search history.

(56) References Cited

U.S. PATENT DOCUMENTS

| | | | |
|---|---|---|---|
| 10,756,536 B2 | 8/2020 | Kral et al. | |
| 2023/0411955 A1* | 12/2023 | Rozenshtein ............ | H02H 9/02 |

FOREIGN PATENT DOCUMENTS

| | | | | |
|---|---|---|---|---|
| CN | 201142562 | | | 10/2008 |
| CN | 102646968 | | | 8/2012 |
| CN | 217087166 | U | * | 7/2022 |
| JP | 2004274863 | A | * | 9/2004 |

OTHER PUBLICATIONS

Machine translation of CN 217087166 by Clarivate Analytics, Oct. 2025, 15 pages.*

Machine translation of JP 2004274863 by Clarivate Analytics, Oct. 2025, 6 pages.*

Zang et al., "Using t e Fault Current Limiter wit Transformer Type Reactor to Reduce S ort Circuit Currents," presented at the IEEE/PES Transmission & Distribution Conference & Exposition: Asia and Pacific, Dalian, China, Aug. 15-18, 2005, 4 pages.

* cited by examiner

*Primary Examiner* — Harry R Behm
(74) *Attorney, Agent, or Firm* — Fish & Richardson P.C.

(57) ABSTRACT

Example methods and systems for short-circuit current control in power systems are disclosed. One example method includes determining a respective maximum short-circuit current (SCC) value at each piece of equipment in the power system. A respective SCC rating of each piece of the equipment in the power system is compared with the respective maximum SCC value at the piece of the equipment. A target reactance of a variable series reactor in a mobile short-circuit control unit (MSCCU) to be installed between two points of the power system is determined in response to the maximum SCC values at one or more pieces of the equipment exceeding the SCC ratings of the one or more pieces of the equipment. A reactance of the variable series reactor is adjusted to the target reactance. The MSCCU is installed between the two points of the power system.

12 Claims, 11 Drawing Sheets

700

900

SHORT-CIRCUIT CURRENT CONTROL IN POWER SYSTEMS

TECHNICAL FIELD

The present disclosure relates to methods and systems for short-circuit current control in power systems.

BACKGROUND

The short-circuit current rating of a piece of equipment in a power system indicates the maximum short-time symmetrical short-circuit current the piece of equipment can withstand. When the short-circuit current contribution from a power source to the piece of equipment exceeds the short-circuit current rating of the piece of equipment, the piece of equipment may become defective.

SUMMARY

The present disclosure involves methods and systems for short-circuit current control in power systems.

Certain aspects of the subject matter described here can be implemented as a mobile short-circuit control unit (MSCCU) for short-circuit current control in a power system. The mobile short-circuit control unit includes a variable series reactor and a control system coupled to the variable series reactor. The variable series reactor is configured to connect two points of the power system, where the variable series reactor includes a winding with multiple tap positions, each of the multiple tap positions corresponds to a respective reactance of the variable series reactor, and the variable series reactor is set to a first tap position of the multiple tap positions.

The mobile short-circuit control unit can include one or more of the following features.

In some implementations, the mobile short-circuit control unit further includes a bypass circuit breaker coupled to the control system and configured to connect the two points of the power system, and where the operations further include sending, at the first time, a second signal to the bypass circuit breaker to open the bypass circuit breaker.

In some implementations, the operations further includes sending, at a second time, a third signal to the variable series reactor to open the variable series reactor; and sending, at the second time, a fourth signal to the bypass circuit breaker to connect the two points of the power system using the bypass circuit breaker.

In some implementations, the first tap position corresponds to a target reactance, and the target reactance is associated with a line-to-line rated voltage of the power system, a short-time withstand symmetrical short-circuit current of a piece of equipment in the power system, and a symmetrical short-circuit current at the piece of equipment.

In some implementations, the piece of equipment includes a bus or a circuit breaker.

In some implementations, one of the two points of the power system is coupled to the piece of equipment, and the other one of the two points is coupled to a power source.

In some implementations, the mobile short-circuit control unit is housed in a mobile enclosure, and the mobile enclosure includes connectors configured to connect the mobile short-circuit control unit to the two points of the power system.

In some implementations, the control system is configured to receive signals from a controller outside the mobile enclosure to operate the mobile short-circuit control unit.

In some implementations, the mobile short-circuit control unit further includes a connection configured to receive power from a power supply to the mobile short-circuit control unit.

In some implementations, the mobile short-circuit control unit further includes a connection circuit breaker configured to connect to the variable series reactor at one end of the connection circuit breaker and one of the two points of the power system at another end of the connection circuit breaker.

Certain aspects of the subject matter described here can be implemented as a method. The method includes determining a respective maximum short-circuit current (SCC) value at each piece of equipment in the power system. A respective SCC rating of each piece of the equipment in the power system is compared with the respective maximum SCC value at the piece of the equipment. A target reactance of a variable series reactor in a mobile short-circuit control unit (MSCCU) to be installed between two points of the power system is determined in response to the maximum SCC values at one or more pieces of the equipment exceeding the SCC ratings of the one or more pieces of the equipment. A reactance of the variable series reactor is adjusted to the target reactance. The MSCCU is installed between the two points of the power system.

The method can include one or more of the following features.

In some implementations, determining the target reactance of the variable series reactor includes obtaining a line-to-line rated voltage of the power system, obtaining a symmetrical short-circuit current between the two points of the power system, and determining the target reactance of the variable series reactor based on the line-to-line rated voltage of the power system, the SCC ratings of the one or more pieces of the equipment, and the symmetrical short-circuit current between the two points of the power system.

In some implementations, adjusting the reactance of the variable series reactor to the target reactance includes selecting a tap position from multiple tap positions of the variable series reactor in the mobile short-circuit control unit, and the tap position corresponds to a reactance of the variable series reactor that is equal to or larger than the target reactance.

In some implementations, after installing the mobile short-circuit control unit between the two points of the power system, connecting the two points of the power system using the variable series reactor in the mobile short-circuit control unit.

In some implementations, connecting the two points of the power system using the variable series reactor includes sending, at a first time, a first signal to the mobile short-circuit control unit, where the first signal indicates to connect the two points of the power system using the variable series reactor.

In some implementations, after installing the mobile short-circuit control unit between the two points of the power system, connecting the two points of the power system using a bypass circuit breaker in the mobile short-circuit control unit.

In some implementations, connecting the two points of the power system using the bypass circuit breaker includes sending, at a second time, a second signal to the mobile short-circuit control unit, where the second signal indicates to connect the two points of the power system using the bypass circuit breaker.

The details of these and other aspects and implementations of the present disclosure are set forth in the accompanying drawings and the description below. Other features, objects, and advantages of the disclosure will be apparent from the description and drawings, and from the claims.

BRIEF DESCRIPTION OF DRAWINGS

Like reference numbers and designations in the various drawings indicate like elements.

DETAILED DESCRIPTION

Figure 1:
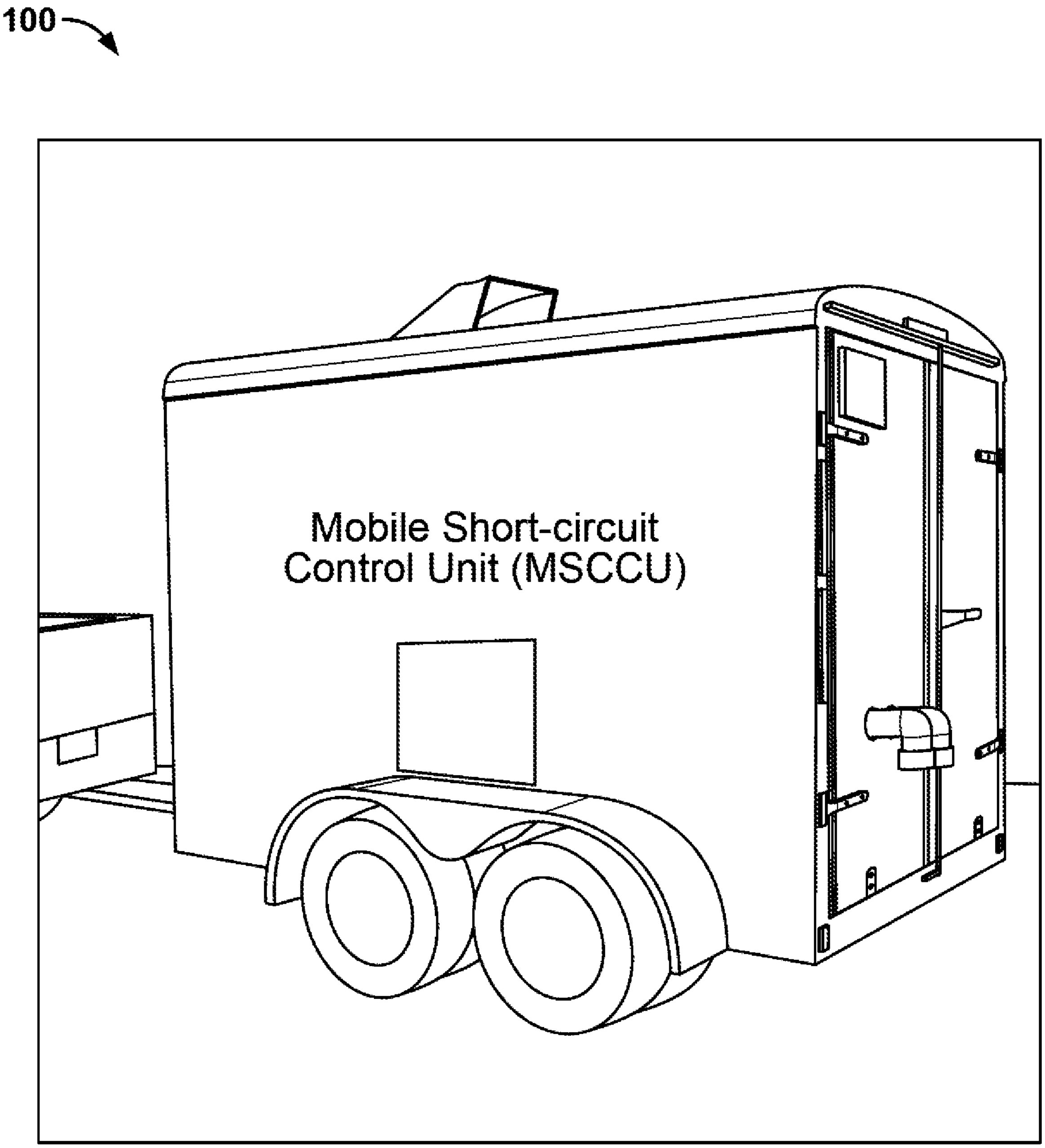
FIG. 1 illustrates an example mobile enclosure that houses a mobile short-circuit control unit (MSCCU).

This disclosure relates to systems and methods for short-circuit current control in power systems. Example power systems can include networks of electrical components deployed in electrical facilities such as refineries, gas processing facilities, petrochemical plants, among other electrical facilities, to supply, transfer, or use electric power. In some cases, to limit the maximum short-circuit current flowing through a piece of equipment in a power system such that the maximum short-circuit current does not exceed the short-circuit current rating of the piece of equipment, a mobile short-circuit control unit (MSCCU) that includes a variable series reactor can be connected to the piece of equipment. The reactance of the variable series reactor can be set to a target reactance before the MSCCU is connected to the piece of equipment to limit the maximum short-circuit current flowing through the piece of equipment to a specific value that can meet the short-circuit current rating of the piece of equipment, without compromising other electrical components and operational processes in the power system. The target reactance can be determined based on the short-circuit current rating of the piece of equipment and the maximum short-circuit current that would have flown through the piece of equipment if the MSCCU is not connected to the piece of equipment.

The disclosed methods and systems provide several advantages over existing systems. For example, the MSCCU can be housed in a mobile enclosure such that it can be transported to different locations, one location at a time, where it can be used to limit short-circuit current flowing between two points of a power system at that particular location. Additionally, the MSCCU can be reused such that it can be connected, one piece of equipment at a time, to different pieces of equipment that have different short-circuit current ratings or experience different maximum short-circuit currents, by resetting the reactance of the variable series reactor inside the MSCCU to the target reactance needed to limit the maximum short-circuit current flowing through the particular piece of equipment to be connected to the MSCCU. Furthermore, the MSCCU can be equipped with its own control and protection system to accommodate scenarios such as maintenance of equipment or large loads associated with motors starting.

This approach can be useful in facilities where backup equipment does not have the same specifications as all of the different pieces of primary equipment that a particular piece of backup equipment may be used to temporarily replace. For example, power systems are designed such that the local maximum short circuit current at each piece of connected equipment is less than the short-circuit current rating of the piece of equipment. However, there is not typically a 1:1 match between operational equipment and back up equipment. For example, a single mobile backup generator is likely to be the designated temporary replacement for multiple operational generators. If the backup generator is used to replace a damaged generator that has a lower capacity, the high capacity temporary replacement may cause the maximum local circuit current to exceed the short-circuit current rating of another piece of equipment in the system. The MSCCU can be used in association with the temporary replacement generator to reduce maximum local circuit currents to below the short-circuit current rating of equipment in the system. In another example, if a faulty switchgear in a power system is replaced by a spare switchgear that has lower short-circuit current rating and is designated as a temporary replacement for multiple operational switchgears, the maximum short-circuit current flowing through the spare switchgear can exceed the short-circuit current rating of the spare switchgear. The MSCCU can be used to in association with the spare switchgear to limit the maximum short-circuit current flowing through the spare switchgear. Once the MSCCU is installed to connect the spare switchgear to the rest of the power system, the MSCCU can limit the maximum short-circuit current flowing through the spare switchgear such that the maximum short-circuit current is lower than the short-circuit current rating of the spare switchgear. These examples show that operational flexibility can be achieved and the required inventory of backup equipment can be reduced.

Figure 5:
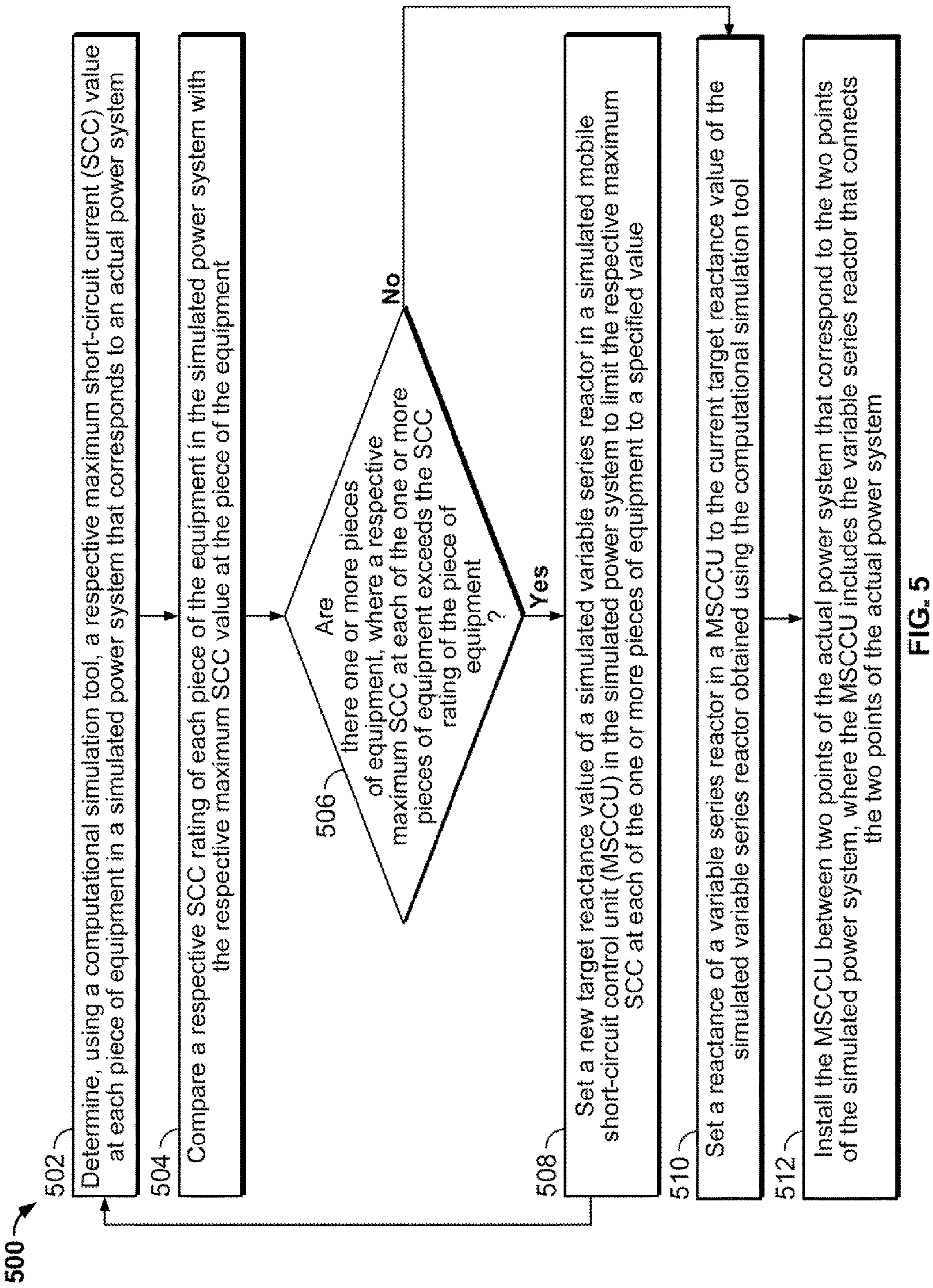
FIG. 5 illustrates an example flow chart of a method to limit the maximum short-circuit current flowing between two points in a power system using a MSCCU.

FIG. 1 illustrates an example mobile enclosure 100 that houses a MSCCU. In some implementations, mobile enclosure 100 can be a wheeled trailer, as shown in FIG. 1. Mobile enclosure 100 can carry the MSCCU to a location within a power system that can be accessed by mobile enclosure 100, and the MSCCU in mobile enclosure 100 can be connected between two points of the power system at that location to limit the maximum short-circuit current flowing through equipment in the power system and connected to the two points. Mobile enclosure 100 can include connectors configured to connect the MSCCU to the two points of the power system. An example method of using the MSCCU to limit the maximum short-circuit current flowing between the two points is shown in FIG. 5 and described below.

Figure 2:
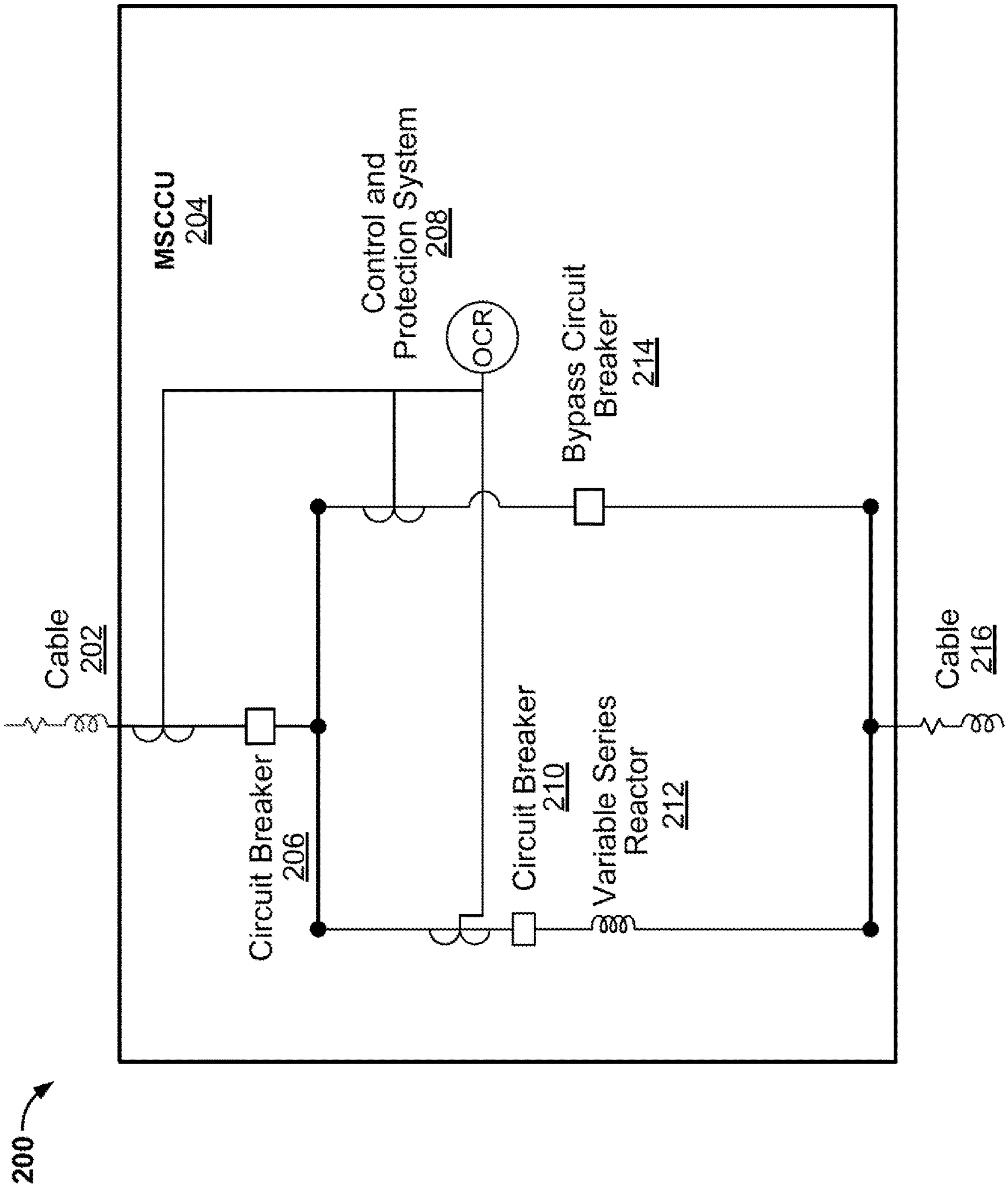
FIG. 2 illustrates an example of a MSCCU.

FIG. 2 illustrates an example MSCCU 204. As shown in FIG. 2, MSCCU 204 can be connected to one point of a power system through cable 202. MSCCU 204 can be connected through cable 216 to another point in the power system. MSCCU 204 includes variable series reactor 212 and its associated circuit breaker 210, as well as bypass circuit breaker 214. The reactance of variable series reactor 212 in MSCCU 204 can be adjusted to a target reactance to limit the maximum short-circuit current between cable 202 and cable 216. MSCCU 204 can also include control and protection system 208 that can be used to open or close circuit breaker 206, variable series reactor 212, and bypass circuit breaker 214 respectively. In some implementations, control and protection system 208 can include an overcurrent relay to protect variable series reactor 212. Control and protection system 208 can send a signal to circuit breaker 206, variable series reactor 212, or bypass circuit breaker 214 respectively to open or close them individually. For example, to control the current between cable 202 and cable 216 such that the current flows through variable series reactor 212, control and protection system 208 can send a signal to variable series reactor 212 to close variable series reactor 212 and, at the same time, send another signal to bypass circuit breaker 214 to open bypass circuit breaker 214. In another example, to control the current between cable 202 and cable 216 to flow through bypass circuit breaker 214, for example, when maintenance of equipment connected to cable 216 needs to be performed, or when equipment such as motors connected to cable 216 need to be started, control and protection system 208 can send a signal to variable series reactor 212 to open variable series reactor 212, while at the same time, send another signal to bypass circuit breaker 214 to close bypass circuit breaker 214.

Figure 3:
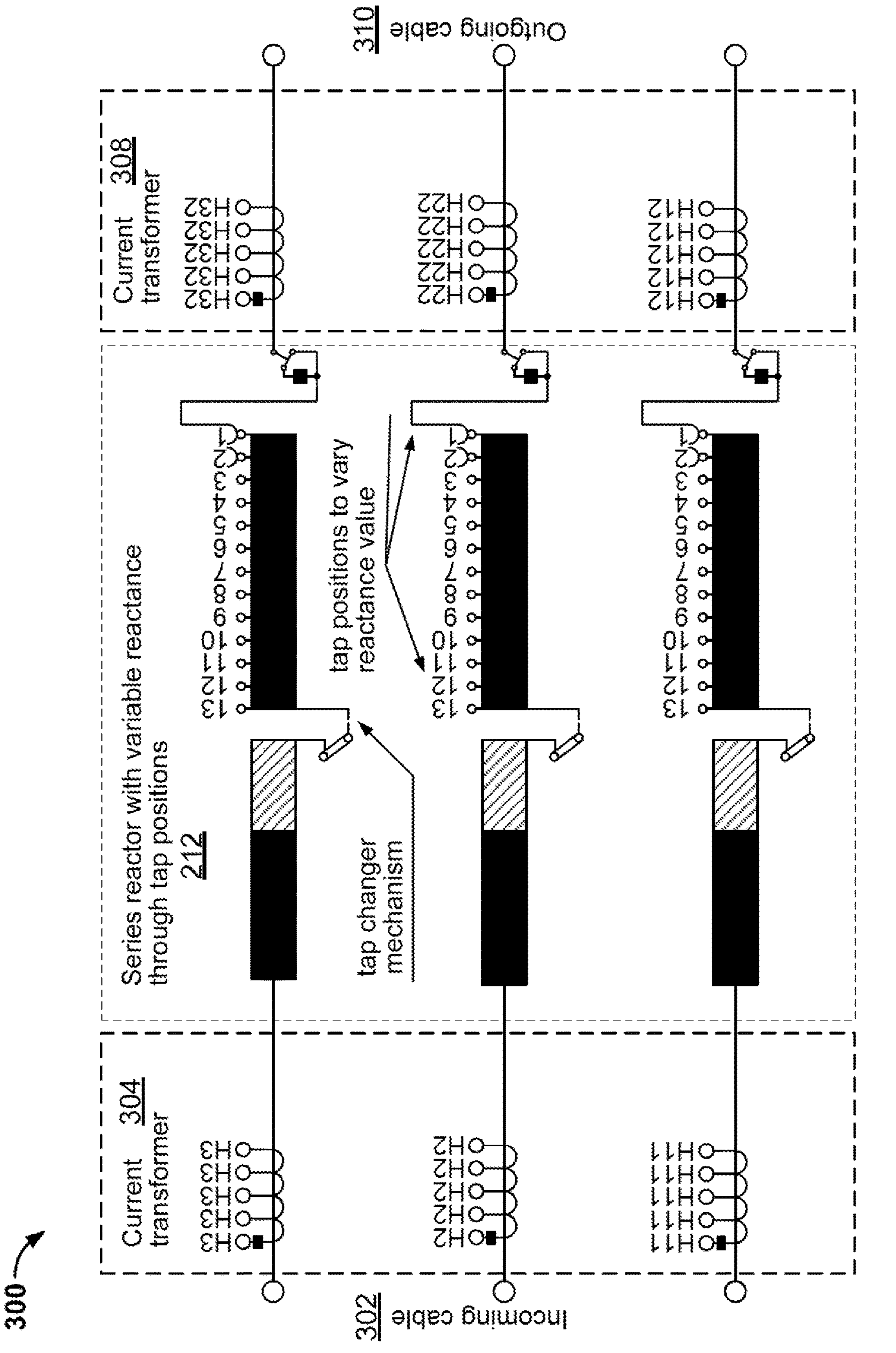
FIG. 3 illustrates an example system that includes a variable series reactor with multiple tap positions.

In some implementations, variable series reactor 212 has multiple tap positions corresponding to multiple reactances, and the reactance of variable series reactor 212 can be set to the target reactance using tap positions in variable series reactor 212, as shown in FIG. 3 and described below. This provides the operational flexibility to allow the MSCCU to be used with different pieces of equipment in different situations.

FIG. 3 illustrates an example system 300 that includes a variable series reactor with multiple tap positions. As shown in FIG. 3, variable series reactor 212 connects current transformer 304 and current transformer 308, where current transformer 304 is connected to incoming cable 302, and current transformer 308 is connected to outgoing cable 310. The reactance value of variable series reactor 212 can be set by selecting a particular tap position from the multiple tap positions of variable series reactor 212. The variable series reactor 212 in FIG. 3 includes 13 tap positions. The range of the reactance value of variable series reactor 212 is from the reactance value that corresponds to tap position 1 to the reactance value that corresponds to tap position 13. An example range of the reactance value of variable series reactor 212 is from 0.015 Ω at tap position 1 to 0.25 Ω at tap position 13. This example range of the reactance value of variable series reactor 212 can provide the flexibility to limit short-circuit current to buses with a minimum of 25 kA short-time short-circuit bracing and interrupting capability, from power sources with short-circuit equivalent of 85 kA at various distribution voltage levels. An example nominal position of variable series reactor 212 in FIG. 3 is tap position 7, with an associated reactance value of 0.14Ω. By adjusting the tap position of variable series reactor 212, the reactance value of variable series reactor 212 can be adjusted to a value that can be used to limit the current on incoming cable 302 and outgoing cable 310 to protect equipment in a power system that has the MSCCU installed is protected.

In some implementations, the closest available tap position % TAP of variable series reactor 212 can be selected according to Equation 1.

$$\%\ \text{TAP} = 100 \cdot \frac{X_{reactor}}{X_{reactor\_min}} \exists\, [X_{reactor\_min}, X_{reactor\_max}], \tag{1}$$

where % TAP is the tap position in variable series reactor 212 expressed as a percentage of the range of reactance of variable series reactor 212. Xreactor is the target reactance of variable series reactor 212. Xreactor_min is the minimum reactance of variable series reactor 212, for example, the reactance corresponding to tap position 1 in FIG. 3, and Xreactor_max is the maximum reactance of variable series reactor 212, for example, the reactance corresponding to tap position 13 in FIG. 3.

Figure 4:
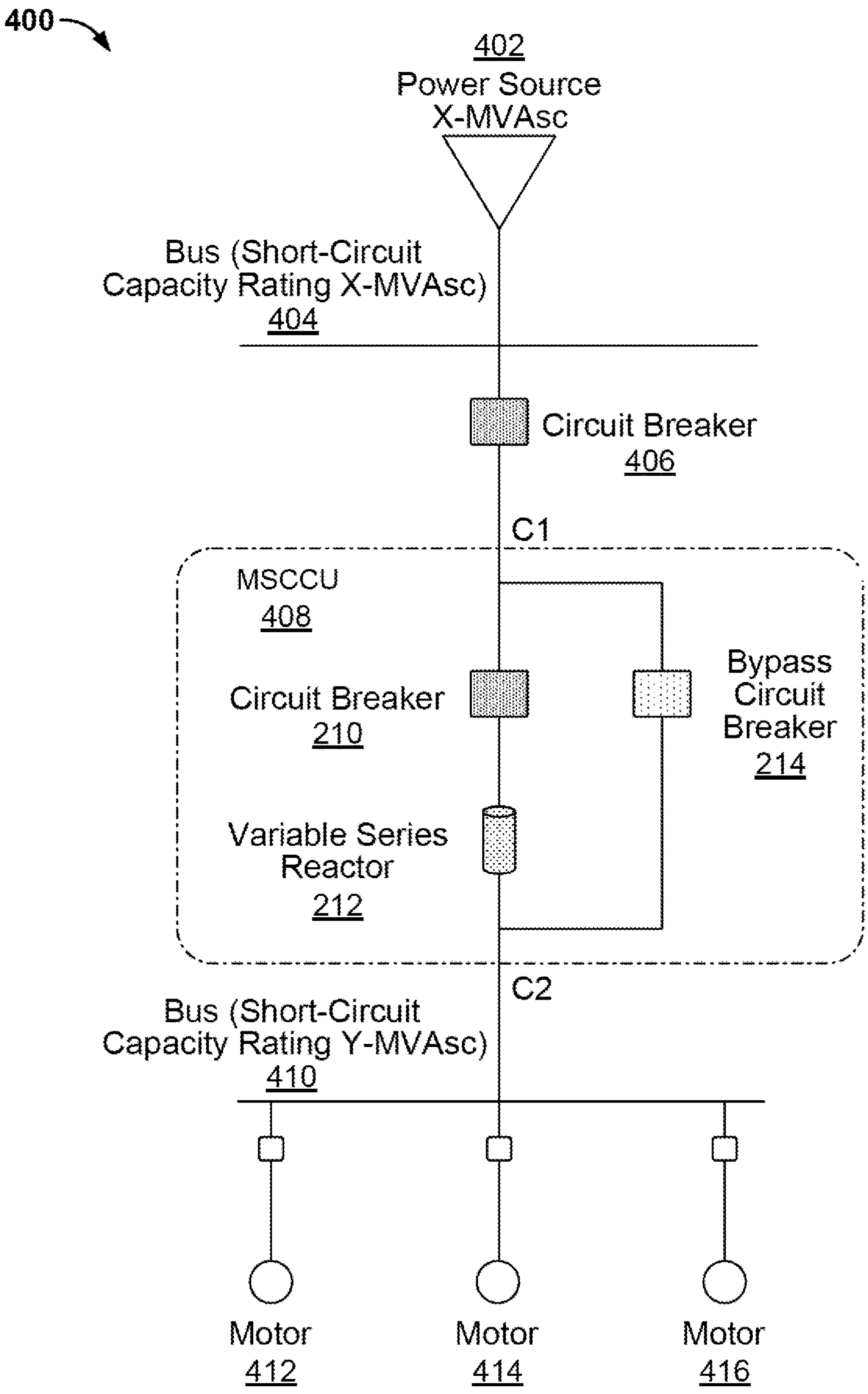
FIG. 4 illustrates a situation when it might be appropriate to incorporate a MSCCU in an example power system with a power source.

FIG. 4 illustrates a situation when it might be appropriate to incorporate a MSCCU in an example power system 400 with a power source 402. The power source 402 has a maximum short-circuit capacity contribution of X-mega volt amperes short circuit (MVAsc), and bus 410 that connects to three motors 412, 414, and 416 has a short-circuit capacity rating of Y-MVAsc. When the maximum short-circuit capacity contribution of power source 402. i.e., X-MVAsc, is greater than the short-circuit capacity rating of bus 410, i.e., Y-MVAsc, bus 410 cannot withstand the maximum short-circuit current contribution from power source 402 in the event of a fault. The MSCCU 408 that includes variable series reactor 212 is used to connect power source 402 and bus 410. In some implementations, MSCCU 408 can include variable series reactor 212 and its associated circuit breaker 210, as well as bypass circuit breaker 214. MSCCU 408 can be connected to power source 402 through circuit breaker 406. MSCCU 408 is connected between two points C1 and C2 in power system 400.

In some implementations, the reactance of variable series reactor 212 in MSCCU 408 can be adjusted to a target reactance to limit the maximum short-circuit current contribution from power source 402 to bus 410 to a value not exceeding the short-circuit current (SCC) rating of bus 410. When variable series reactor 212 is used to limit the maximum short-circuit current contribution from power source 402 to bus 410, bypass circuit breaker 214 can be set to open such that the current between power source 402 and bus 410 goes through variable series reactor 212 instead of bypass circuit breaker 214. The target reactance of variable series reactor 212 can be determined according to Equation 2.

$$X_{reactor} = \frac{U_{LL}}{\sqrt{3}} \cdot \left(\frac{1}{Isc_{bus}} - \frac{1}{Isc_{source}}\right), \tag{2}$$

where Xreactor is the target reactance of variable series reactor 212, $U_{LL}$ is the line-to-line rated voltage of power system 300. Iscbus is the short-time withstand symmetrical short-circuit current of bus 410, and Iscsource is the maximum source symmetrical short-circuit current at bus 410 when bus 410 is connected directly to power source 402 through circuit breaker 406, without going through MSCCU 408 first.

Figure 6:
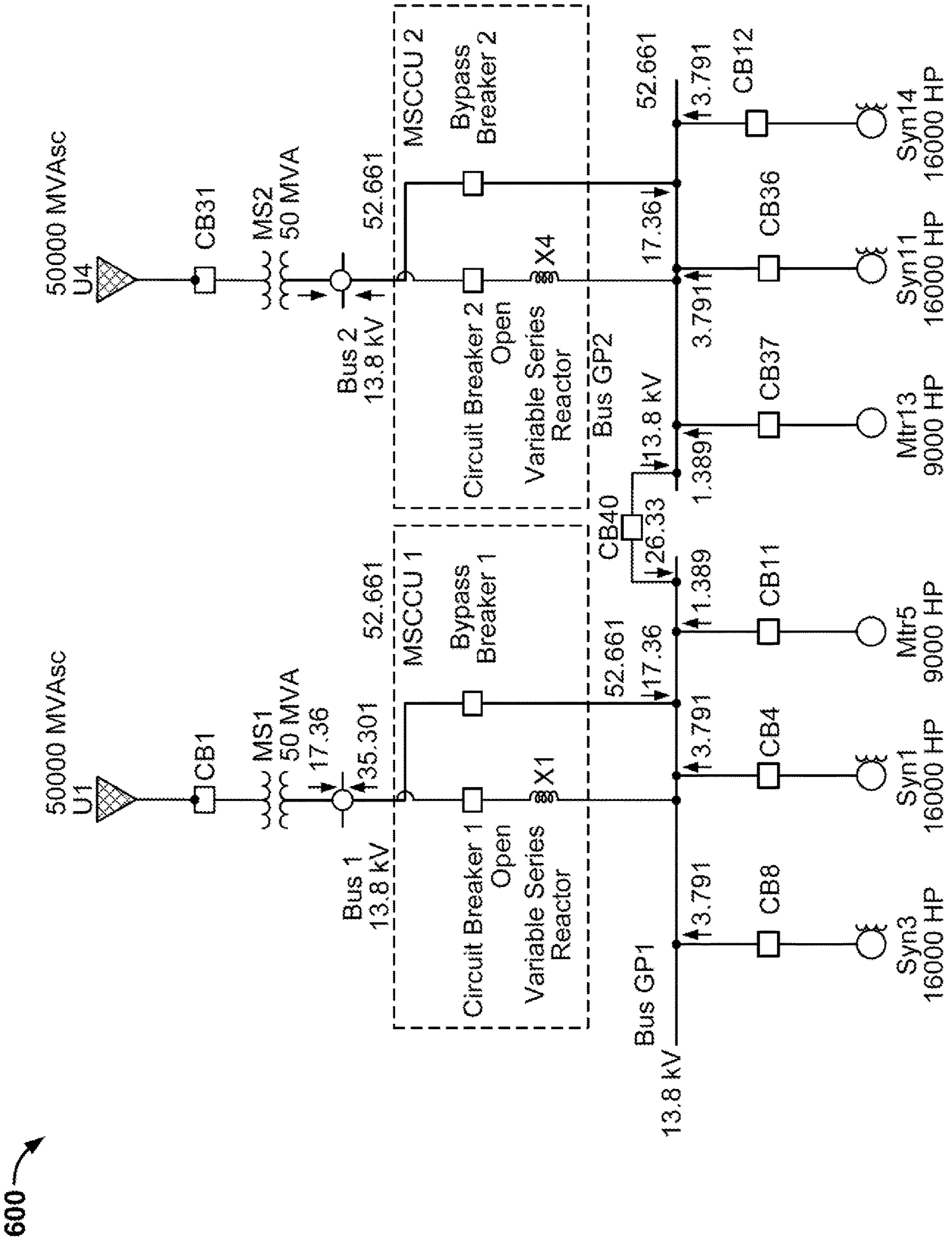
FIG. 6 illustrates an example of simulated maximum short-circuit currents in a power system without the variable series reactor in either MSCCU connected.

FIG. 5 illustrates an example flow chart 500 of a method to limit the maximum short-circuit current flowing between two points in a power system using a MSCCU. At 502, an operator determines, using a computational simulation tool, a respective maximum short-circuit current (SCC) value at each piece of equipment in a simulated power system that corresponds to an actual power system. The simulated power system includes a simulated variable series reactor in the MSCCU and connecting two points of the simulated power system. In some implementations, 502 is initiated after it is determined that one or more pieces of equipment or power sources in the actual power system need to be changed to new equipment or power sources. The simulated power system corresponds to the actual power system with the new one or more pieces of equipment or power sources. The simulated variable series reactor is initially bypassed, effectively setting a reactance of the simulated variable series reactor to 0. An example simulation result of maximum SCC value at each piece of equipment in a simulated power system is shown in FIG. 6 and described later. An example computational simulation tool is Electrical Transient and Analysis Program (ETAP®), an energy management software tool.

At 504, the computational simulation tool compares a respective SCC rating of each piece of the equipment in the simulated power system with the respective maximum SCC value at the piece of the equipment.

At 506, the computational simulation tool determines, based on the comparison at 504, whether there are one or more pieces of equipment, where a respective maximum SCC at each of the one or more pieces of equipment exceeds the SCC rating of the piece of equipment. If there are one or more pieces of equipment, where the respective maximum SCC at each of the one or more pieces of equipment exceeds the SCC rating of the piece of equipment, then at 508, the computational simulation tool sets a new target reactance value of the simulated variable series reactor to limit the respective maximum SCC at each of the one or more pieces of equipment to a specified value. If this occurs on the initial simulation, the MSCCU bypass breaker is opened and the variable series reactor is closed. Next the computational simulation tool repeats 502 through 508.

If at 506, the computational simulation tool determines that the respective maximum SCC at each of the one or more pieces of equipment is equal to or less than the SCC rating of the piece of equipment, then at 510, a reactance of a variable series reactor in a mobile short-circuit control unit (MSCCU) is set to the current target reactance value of the simulated variable series reactor obtained using the computational simulation tool. In some implementations, the variable series reactor can have multiple tap positions with each tap position corresponding to a specific reactance value of the variable series reactor, and the reactance value of the variable series reactor in the MSCCU can be set to the latest target reactance value of the simulated variable series reactor using one of the tap positions in the variable series reactor that has a corresponding reactance value that is closest to the latest target reactance value among all the reactance values provided by the variable series reactor and larger than the latest target reactance value. An example of the variable series reactor is shown in FIG. 3 and described earlier.

At 512, the MSCCU is installed between two points of the actual power system that correspond to the two points of the simulated power system, where the MSCCU includes the variable series reactor that connects the two points of the actual power system. Therefore, the variable series reactor that connects the two points of the actual power system can limit the SCC in the actual power system such that the respective maximum SCC value at each piece of equipment in the actual power system does not exceed the SCC rating of the piece of equipment. In some implementations, the mobile enclosure shown in FIG. 1 can be used to move the MSCCU to the location where the two points of the actual power system are at for connecting the MSCCU to the two points of the power system and consequently protecting the equipment in the actual power system.

Figure 7:
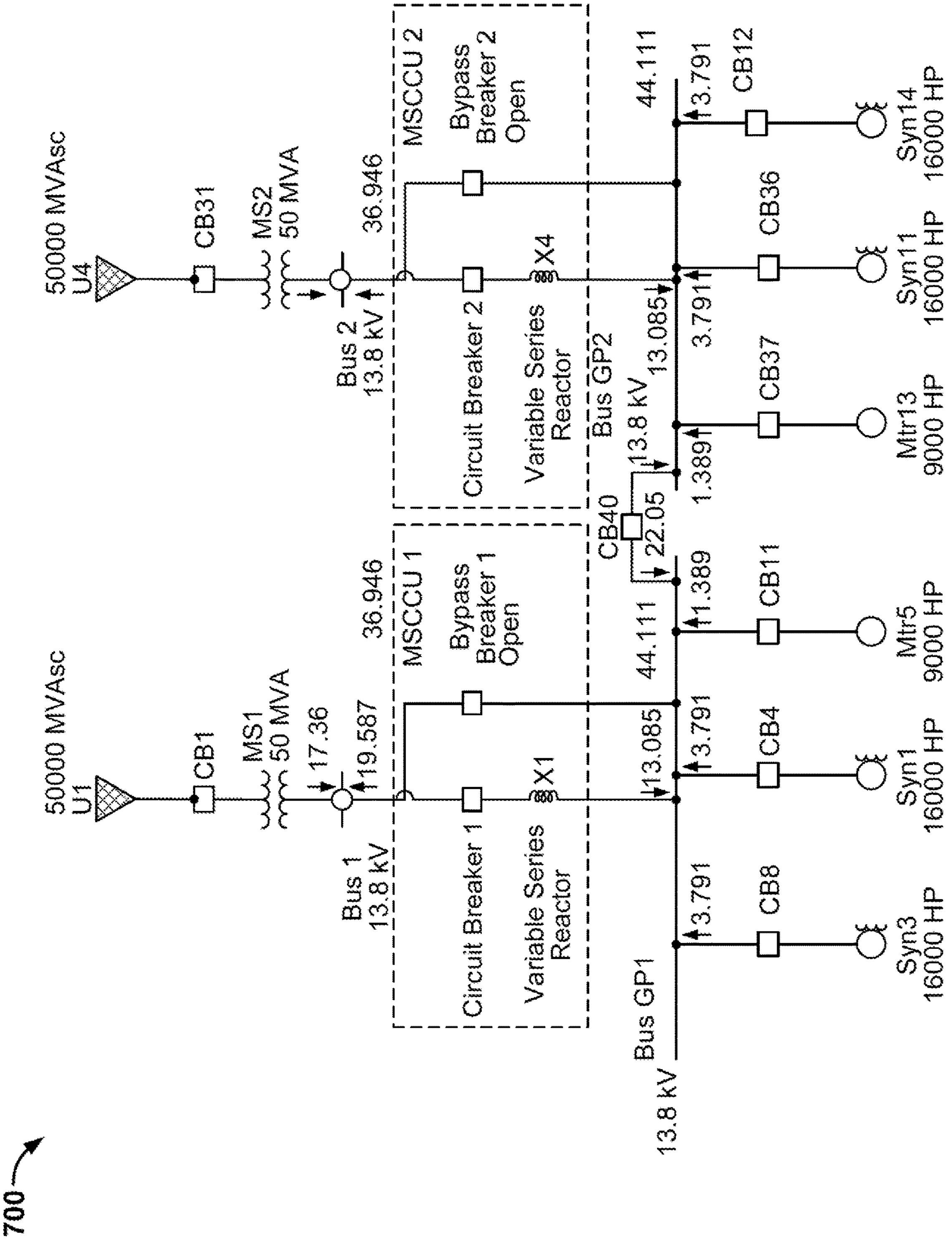
FIG. 7 illustrates a power system with the variable series reactor in each MSCCU connected.

In some implementations, both the final target reactance value of the variable series reactor and the two points of the actual power system where the MSCCU is to be installed, can be determined using one or more simulations. For operational efficiency, it is generally preferable to install the MSCCU close to the backup equipment being used. For example, if a new power source is replacing an existing power source in the actual power system and causing the maximum SCCs to change at one or more pieces of equipment in the actual power system, then the one or more simulations can be carried out to determine the final target reactance value of the variable series reactor as well as the two points of the power system where the MSCCU is to be installed. A simulation result of the SCCs in a simulated power system with one or more variable series reactors limiting the SCCs in the simulated power system is shown in FIG. 7 and described later.

FIG. 6 illustrates an example of simulated maximum short-circuit currents in a power system 600 without the variable series reactor in either MSCCU connected. Power source U1 is connected to bus 1 through circuit breaker CB1 and transformer MS1. Motors Syn3, Sync1, and Mtr5 are connected to bus GP1 through circuit breakers CB8, CB4, and CB11 respectively. Two MSCCUs, MSCCU 1 and MSCCU 2, are shown in FIG. 6. MSCCU 1 includes variable series reactor X1, circuit breaker 1, and bypass breaker 1. MSCCU 2 includes variable series reactor X1, circuit breaker 1, and bypass breaker 1. Power source U4 is connected to bus 2 through circuit breaker CB31 and transformer MS2. Motors Mtr13, Syn11, and Sync14 are connected to bus GP2 through circuit breakers CB37, CB36, and CB12 respectively.

The system is set with the MSCCUs off (i.e., circuit breakers associated with the variable series reactor open and bypass circuit breakers closed). In effect, this also simulates the system without the MSCCUs. Currents between bus 1 and bus GP1 flow through bypass breaker 1 as circuit breaker 1 is open. Therefore, currents between bus 1 and bus GP1 do not flow through variable series reactor X1. Currents between bus 2 and bus GP2 flow through bypass breaker 2 as circuit breaker 2 is open. Therefore, currents between bus 2 and bus GP2 do not flow through variable series reactor X4. This configuration can be used to simulate the respective maximum short-circuit current at each piece of equipment in the power system. The simulated maximum short-circuit currents can be used at 502 of flow chart 200 in FIG. 5 to identify whether there are one or more pieces of equipment in the power system, where a respective maximum short-circuit current at each of the one or more pieces of equipment exceeds the short-circuit current rating of the piece of equipment.

As shown in FIG. 6, the maximum short-circuit current flowing from bus GP1 to bus 1 is 35.301 A, which equals the sum of the maximum short-circuit currents from the three motors Syn3, Syn1, and Mtr5 to bus GP1 and the maximum short-circuit current from circuit breaker CB40 to bus GP1. The maximum short-circuit current flowing from bus GP2 to bus 2 is 35.301 A, which equals the sum of the maximum short-circuit currents from the three motors Mtr13. Syn11, and Syn14 to bus GP2 and the maximum short-circuit current from circuit breaker CB40 to bus GP2. The maximum short-circuit current contribution from power source U1 to bus 1 is 17.36 A, which is the same as the maximum short-circuit current flowing from bus 1 to bus GP1 through bypass breaker 1. The maximum short-circuit current contribution from power source U4 to bus 2 is 17.36 A, which is the same as the maximum short-circuit current flowing from bus 2 to bus GP2 through bypass breaker 2.

To reduce the maximum short-circuit currents flowing between bus 1 and bus GP1, variable series reactor 1 can be used to connect bus 1 and bus GP1, while bypass breaker 1 is set to open, as shown in FIG. 7 and described below. Similarly, to reduce the maximum short-circuit currents flowing between bus 2 and bus GP2, variable series reactor 2 can be used to connect bus 2 and bus GP2, while bypass breaker 2 is set to open, as shown in FIG. 7 and described below.

FIG. 7 illustrates a power system 700 with the variable series reactor in each MSCCU connected. Therefore currents between bus 1 and bus GP1 flow through variable series reactor X1 instead of circuit breakers 1, and currents between bus 2 and bus GP2 flow through variable series reactor X4 instead of circuit breakers 2.

As shown in FIG. 7, the maximum short-circuit current flowing from bus GP1 to bus 1 is 19.587 A, which is less than 35.301 A, the sum of the maximum short-circuit currents from the three motors Syn3, Syn1, and Mtr5 to bus GP1 and the maximum short-circuit current from circuit breaker CB40 to bus GP1. This reduction in maximum short-circuit current flowing from bus GP1 to bus 1 is due to the reactance of variable series reactor X1 connecting bus 1 and bus GP1. The maximum short-circuit current flowing from bus GP2 to bus 2 is 19.587 A, which less than 35.301 A, the sum of the maximum short-circuit currents from the three motors Mtr13, Syn11, and Syn14 to bus GP2 and the maximum short-circuit current from circuit breaker CB40 to bus GP2.

Additionally, the maximum short-circuit current flowing from bus 1 to bus GP1 through variable series reactor X1 is 13.085 A, which is less than 17.36 A, the maximum short-circuit current contribution from power source U1 to bus 1. This reduction in maximum short-circuit current flowing from bus 1 to bus GP1 is due to the reactance of variable series reactor X1 connecting bus 1 and bus GP1. The maximum short-circuit current flowing from bus 2 to bus GP3 through variable series reactor X1 is 13.085 A, which is less than 17.36 A, the maximum short-circuit current contribution from power source U4 to bus 2.

Therefore, the comparison of maximum short-circuit currents between FIG. 6 and FIG. 7 shows that variable series reactors X1 and X4 can be used to reduce the currents flowing between bus 1 and bus GP1, and between bus 2 and bus GP2, respectively.

Figure 8:
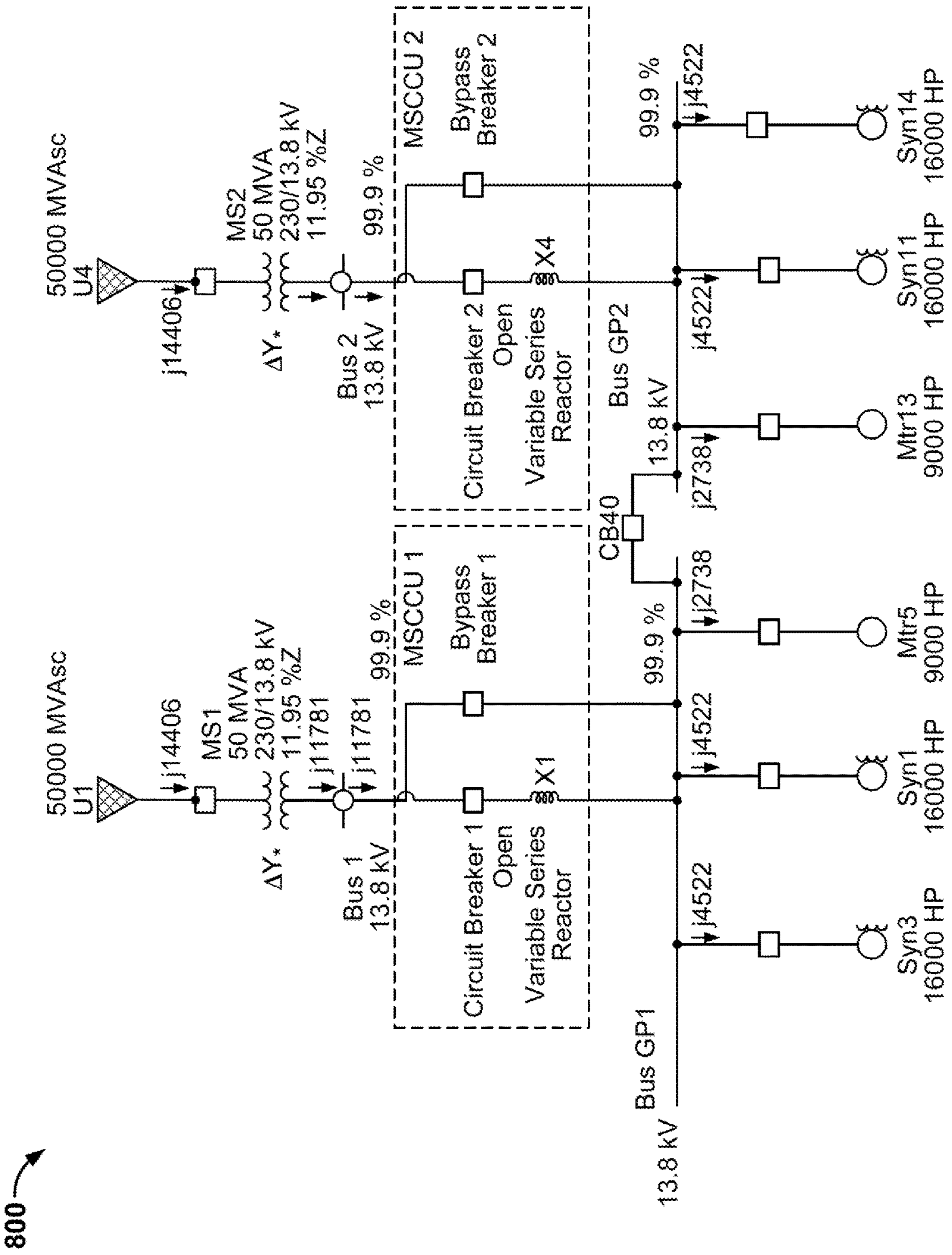
FIG. 8 illustrates an example of simulated voltages in the power system shown in FIG. 6 without the variable series reactor in either MSCCU connected.

FIG. 8 illustrates an example 800 of simulated voltages in the power system shown in FIG. 6 without the variable series reactor in either MSCCU connected. In MSCCU 1, bypass breaker 1 is closed and variable series reactor X1 is open. Currents between bus 1 and bus GP1 flow through bypass breaker 1 as circuit breaker 1 is open. Currents between bus 1 and bus GP1 do not flow through variable series reactor X1 as variable series reactor X1 is closed. In MSCCU 2, bypass breaker 3 is closed and variable series reactor X4 is open. Currents between bus 2 and bus GP2 flow through bypass breaker 2 as circuit breaker 2 is open. Currents between bus 2 and bus GP2 do not flow through variable series reactor X4 as variable series reactor X4 is closed. As shown in FIG. 8, the voltage as a percentage of the line-to-line rated voltage is 99.9% at all the four buses shown in FIG. 8, i.e., bus 1, bus GP1, bus 2, and bus GP2.

Figure 9:
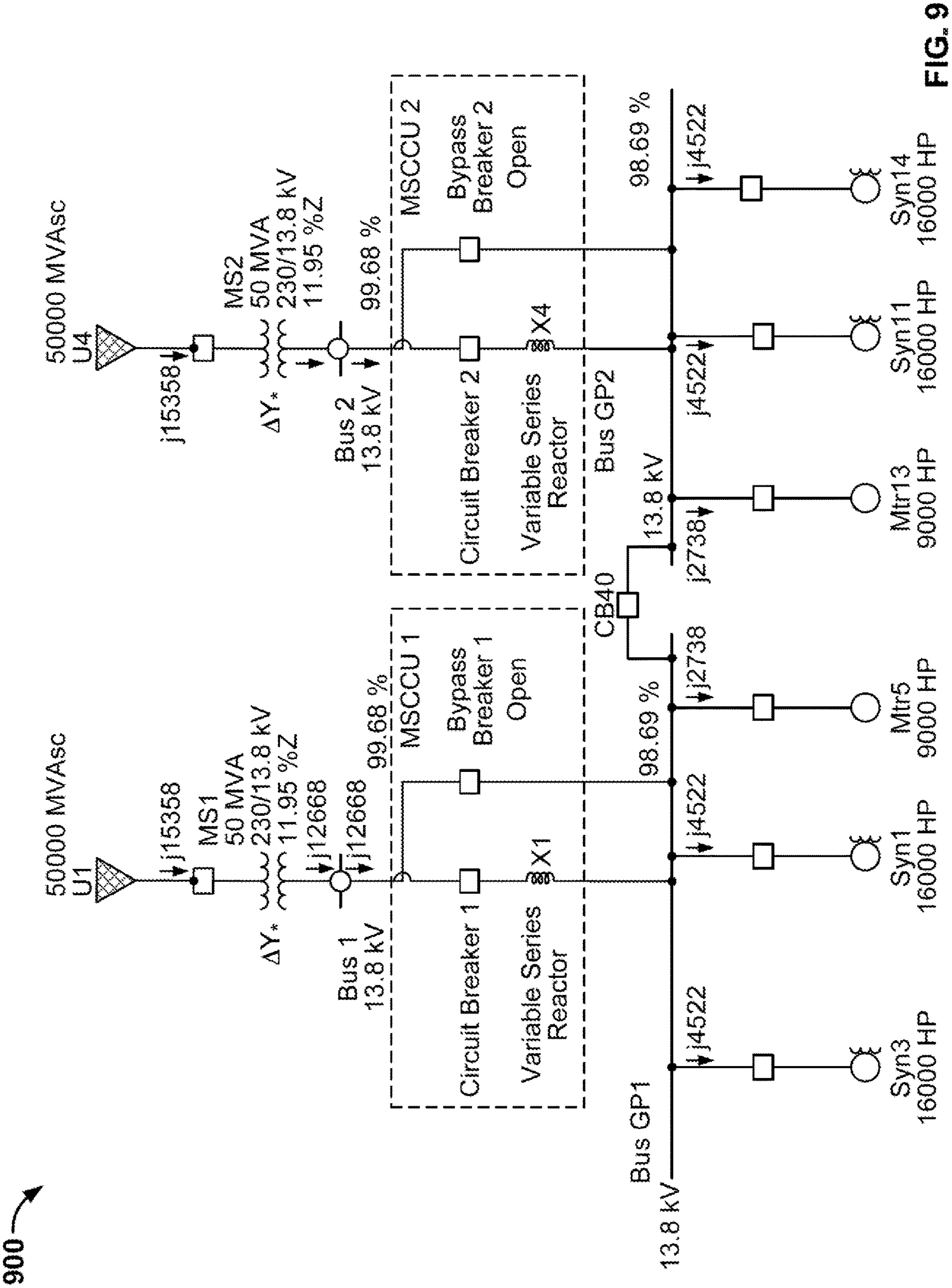
FIG. 9 illustrates an example of simulated voltages in the power system shown in FIG. 7 with the variable series reactor in each MSCCU connected.

FIG. 9 illustrates an example 900 of simulated voltages in the power system shown in FIG. 7 with the variable series reactor in each MSCCU connected. When compared to FIG. 8, bypass breakers 1 and 2 are open instead of closed, and circuit breakers 1 and 2 are closed instead of open. Therefore currents between bus 1 and bus GP1 flow through variable series reactor X1 instead of circuit breakers 1, and currents between bus 2 and bus GP2 flow through variable series reactor X4 instead of circuit breakers 2. As shown in FIG. 9, the voltage as a percentage of the line-to-line rated voltage is 99.68% at bus 1 and bus 2, which is comparable to 99.9% at bus 1 and bus 2 of FIG. 8. The voltage as a percentage of the line-to-line rated voltage is 98.69% at bus GP1 and bus GP2, which is also comparable to 99.9% at bus GP1 and bus GP2 of FIG. 8. Therefore, using variable series reactor X1 and X4 instead of bypass breaker 1 and 2 in MSCCU 1 and MSCCU 2 respectively to connect the respective buses has negligible effect on the voltages at the four buses, i.e., bus 1, bus GP1, bus 2, and bus GP2.

Figure 10:
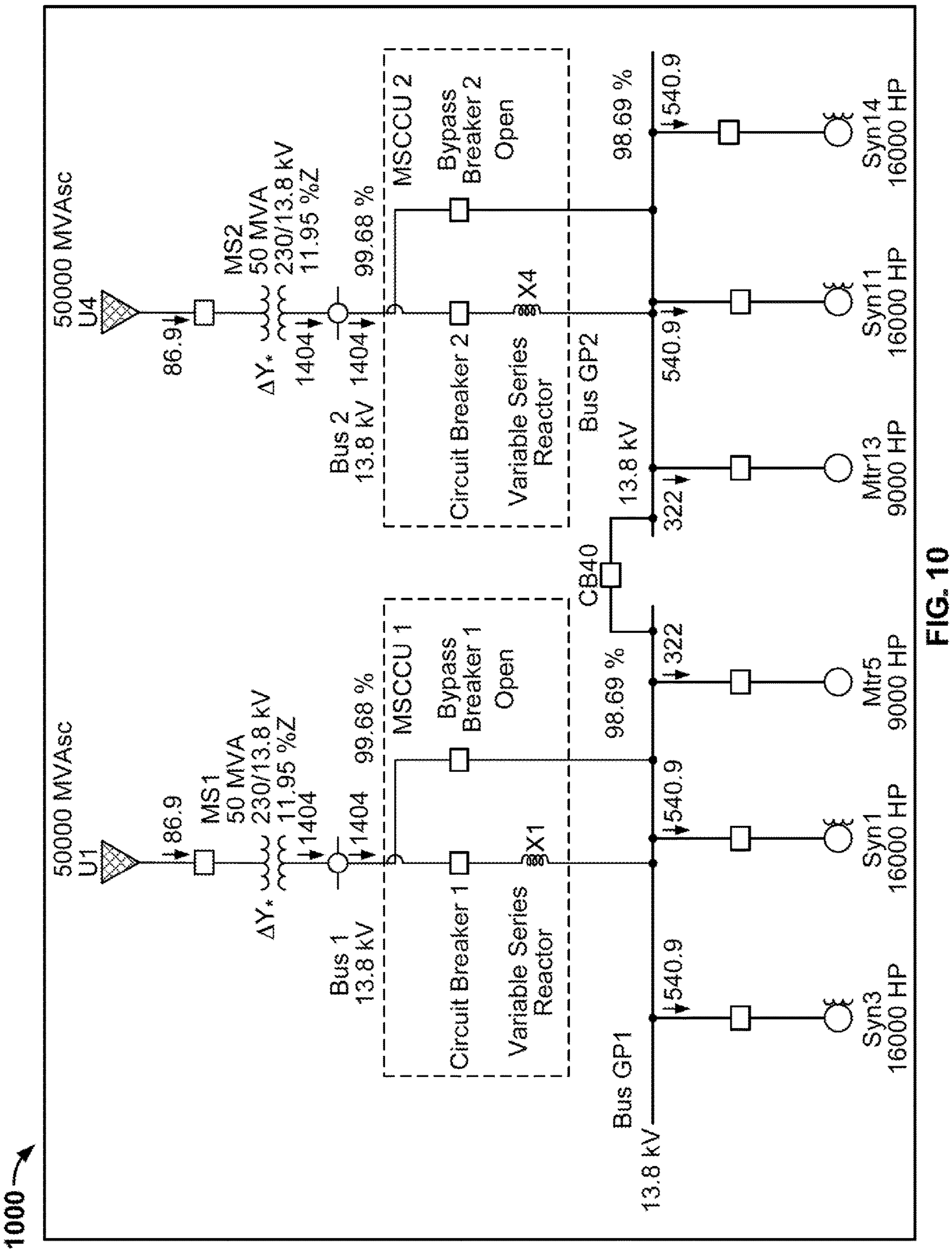
FIG. 10 illustrates an example of simulated currents and voltages in a power system under normal operation conditions.

FIG. 10 illustrates an example of simulated currents and voltages in a power system 1000 under normal operation conditions. Bypass breakers 1 and 2 are open instead of closed, and circuit breakers 1 and 2 are closed instead of open. Therefore currents between bus 1 and bus GP1 flow through variable series reactor X1 instead of circuit breakers 1, and currents between bus 2 and bus GP2 flow through variable series reactor X4 instead of circuit breakers 2. As shown in FIG. 10, the current at the location of bus GP1 that connects bus GP1 to motor Syn3 is 540.9 A. The voltage as a percentage of the line-to-line rated voltage is 99.68% at bus 1 and bus 2. The voltage as a percentage of the line-to-line rated voltage is 98.69% at bus GP1 and bus GP2.

Figure 11:
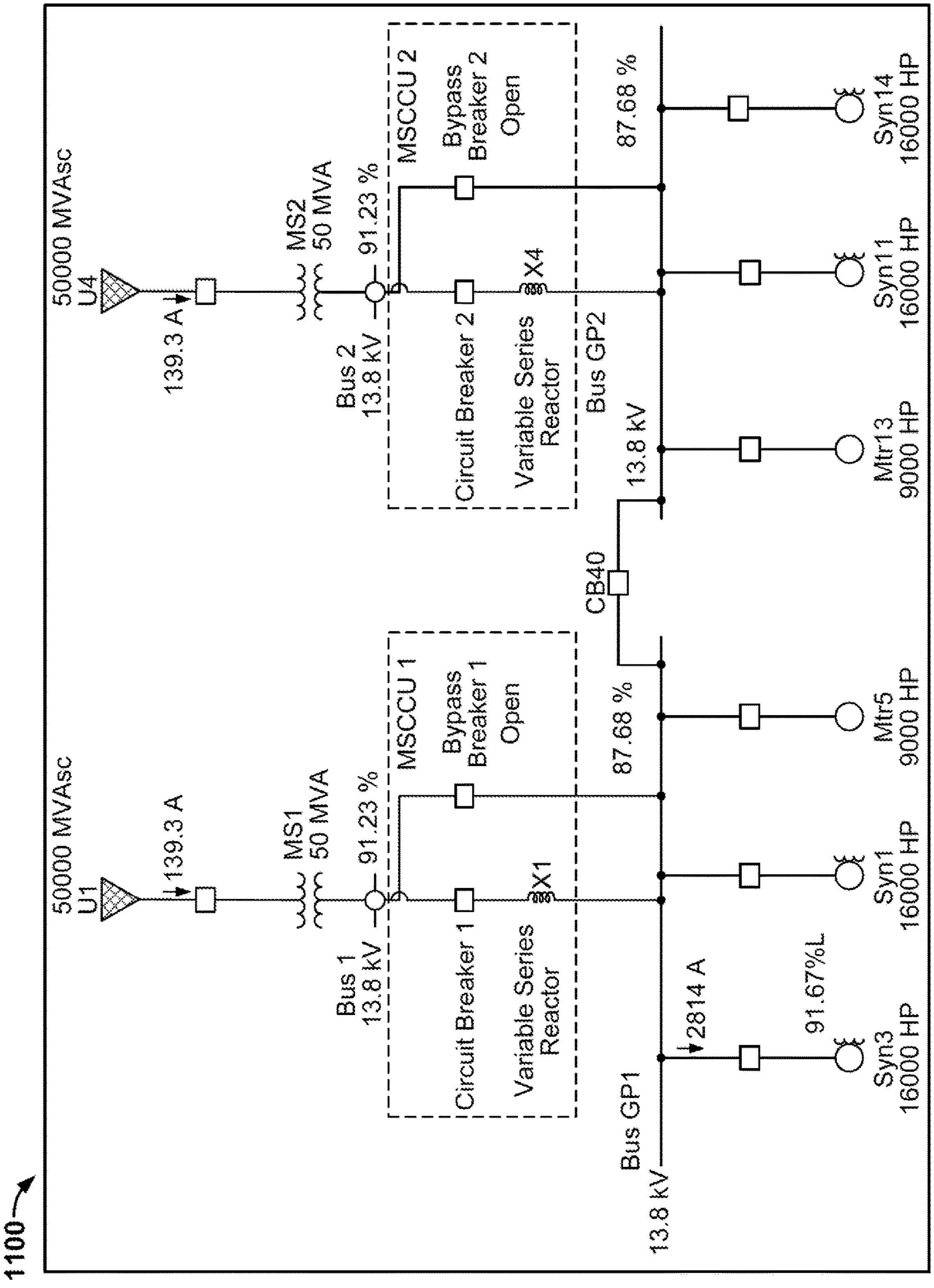
FIG. 11 illustrates an example of simulated currents and voltages in the power system shown in FIG. 10 when a motor in the power system starts.

FIG. 11 illustrates an example 1100 of simulated currents and voltages in the power system shown in FIG. 10 when a motor in the power system starts. When one or more motors in FIG. 11, for example, motor Syn3 connected to bus GP1, start, the current flowing from bus GP1 to motor Syn3 can be very large. As shown in FIG. 11, the current flowing from bus GP1 to motor Syn3 is 2814 A, which is much larger than the current of 540.9 A flowing from bus GP1 to motor Syn3 in FIG. 10. This large initial current of 2814 A, when motor Syn3 starts, can reduce the voltages at all the buses significantly. For example, the voltage as a percentage of the line-to-line rated voltage is 91.23% at bus 1 and bus 2, instead of 99.68% at bus 1 and bus 2 in FIG. 10, and the voltage as a percentage of the line-to-line rated voltage is 87.68% at bus GP1 and bus GP2, instead of 98.69% at Bus GP1 and bus GP2 in FIG. 10. Therefore, bypass breakers 1 and 2 can be closed and variable series reactors X1 and X4 can be open when one or more motors in FIG. 11 start, such that significant reduction of the voltages at the four buses in FIG. 11 can be avoided. In operation, the bypass circuit breaker of the MSCCU will be closed and circuit breaker associated with the variable series reactor will be open when starting a motor if needed. In this configuration, a fault may result in local short circuit currents exceeding short circuit ratings for one or more pieces of equipment because the variable series reactor is not providing protection. This risk is minimal because the bypass circuit breaker is closed and circuit breaker associated with the variable series reactor is opened after the motor is started.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

As used in this disclosure, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, the phraseology or terminology employed in this disclosure, and not otherwise defined, is for the purpose of description only and not of limitation. Any use of section headings is intended to aid reading of the document and is not to be interpreted as limiting; information that is relevant to a section heading may occur within or outside of that particular section.

As used in this disclosure, the term "about" or "approximately" can allow for a degree of variability in a value or range, for example, within 10%, within 5%, or within 1% of a stated value or of a stated limit of a range.

As used in this disclosure, the term "substantially" refers to a majority of, or mostly, as in at least about 50%, 60%, 70%, 80%, 90%, 95%, 96%, 97%, 98%, 99%, 99.5%, 99.9%, 99.99%, or at least about 99.999% or more.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "0.1% to about 5%" or "0.1% to 5%" should be interpreted to include about 0.1% to about 5%, as well as the individual values (for example, 1%, 2%, 3%, and 4%) and the sub-ranges (for example, 0.1% to 0.5%, 1.1% to 2.2%, 3.3% to 4.4%) within the indicated range. The statement "X to Y" has the same meaning as "about X to about Y," unless indicated otherwise. Likewise, the statement "X, Y, or Z" has the same meaning as "about X, about Y, or about Z," unless indicated otherwise.

Particular implementations of the subject matter have been described. Other implementations, alterations, and permutations of the described implementations are within the scope of the following claims as will be apparent to those skilled in the art. While operations are depicted in the drawings or claims in a particular order, such operations are not required be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations are not required in all implementations, and the described components and systems can generally be integrated together or packaged into multiple products.

Accordingly, the previously described example implementations do not define or constrain the present disclosure. Other changes, substitutions, and alterations are also possible without departing from the spirit and scope of the present disclosure.

We claim:

1. A method of short-circuit current control in a power system, the method comprising:

determining a respective maximum short-circuit current (SCC) value at each piece of equipment in the power system;

comparing a respective SCC rating of each piece of the equipment in the power system with the respective maximum SCC value at the piece of the equipment;

in response to the maximum SCC values at one or more pieces of the equipment exceeding the SCC ratings of the one or more pieces of the equipment, determining a target reactance of a variable series reactor in a mobile short-circuit control unit to be installed between two points of the power system;

adjusting a reactance of the variable series reactor to the target reactance;

installing the mobile short-circuit control unit between the two points of the power system; and wherein adjusting the reactance of the variable series reactor to the target reactance comprises selecting a tap position from a plurality of tap positions of the variable series reactor in the mobile short-circuit control unit, and wherein the tap position corresponds to the reactance of the variable series reactor that is equal to or larger than the target reactance.

2. The method according to claim 1, wherein determining the target reactance of the variable series reactor comprises:

obtaining a line-to-line rated voltage of the power system;

obtaining a symmetrical short-circuit current between the two points of the power system; and determining the target reactance of the variable series reactor based on the line-to-line rated voltage of the power system, the SCC ratings of the one or more pieces of the equipment, and the symmetrical short-circuit current between the two points of the power system.

3. The method according to claim 1, further comprising:

after installing the mobile short-circuit control unit between the two points of the power system, connecting the two points of the power system using the variable series reactor in the mobile short-circuit control unit.

4. A method of short-circuit current control in a power system, the method comprising:

determining a respective maximum short-circuit current (SCC) value at each piece of equipment in the power system;

comparing a respective SCC rating of each piece of the equipment in the power system with the respective maximum SCC value at the piece of the equipment;

in response to the maximum SCC values at one or more pieces of the equipment exceeding the SCC ratings of the one or more pieces of the equipment, determining a target reactance of a variable series reactor in a mobile short-circuit control unit to be installed between two points of the power system;

adjusting a reactance of the variable series reactor to the target reactance;

installing the mobile short-circuit control unit between the two points of the power system; and after installing the mobile short-circuit control unit between the two points of the power system, connecting the two points of the power system using the variable series reactor in the mobile short-circuit control unit;

wherein connecting the two points of the power system using the variable series reactor comprises sending, at a first time, a first signal to the mobile short-circuit control unit, wherein the first signal indicates to connect the two points of the power system using the variable series reactor.

5. A method of short-circuit current control in a power system, the method comprising:

determining a respective maximum short-circuit current (SCC) value at each piece of equipment in the power system;

comparing a respective SCC rating of each piece of the equipment in the power system with the respective maximum SCC value at the piece of the equipment;

in response to the maximum SCC values at one or more pieces of the equipment exceeding the SCC ratings of the one or more pieces of the equipment, determining a target reactance of a variable series reactor in a mobile short-circuit control unit to be installed between two points of the power system;

adjusting a reactance of the variable series reactor to the target reactance;

installing the mobile short-circuit control unit between the two points of the power system; and after installing the mobile short-circuit control unit between the two points of the power system, connecting the two points of the power system using a bypass circuit breaker in the mobile short-circuit control unit.

6. The method according to claim 5, wherein connecting the two points of the power system using the bypass circuit breaker comprises sending, at a second time, a second signal to the mobile short-circuit control unit, wherein the second signal indicates to connect the two points of the power system using the bypass circuit breaker.

7. The method according to claim 4, wherein determining the target reactance of the variable series reactor comprises:

obtaining a line-to-line rated voltage of the power system;

obtaining a symmetrical short-circuit current between the two points of the power system; and determining the target reactance of the variable series reactor based on the line-to-line rated voltage of the power system, the SCC ratings of the one or more pieces of the equipment, and the symmetrical short-circuit current between the two points of the power system.

8. The method according to claim 4, wherein adjusting the reactance of the variable series reactor to the target reactance comprises selecting a tap position from a plurality of tap positions of the variable series reactor in the mobile short-circuit control unit, and wherein the tap position corresponds to a reactance of the variable series reactor that is equal to or larger than the target reactance.

9. The method according to claim 4, further comprising: after installing the mobile short-circuit control unit between the two points of the power system, connecting the two points of the power system using the variable series reactor in the mobile short-circuit control unit.

10. The method according to claim 5, wherein determining the target reactance of the variable series reactor comprises:

obtaining a line-to-line rated voltage of the power system;

obtaining a symmetrical short-circuit current between the two points of the power system; and determining the target reactance of the variable series reactor based on the line-to-line rated voltage of the power system, the SCC ratings of the one or more pieces of the equipment, and the symmetrical short-circuit current between the two points of the power system.

11. The method according to claim 5, wherein adjusting the reactance of the variable series reactor to the target reactance comprises selecting a tap position from a plurality of tap positions of the variable series reactor in the mobile short-circuit control unit, and wherein the tap position corresponds to a reactance of the variable series reactor that is equal to or larger than the target reactance.

12. The method according to claim 5, further comprising: after installing the mobile short-circuit control unit between the two points of the power system, connecting the two points of the power system using the variable series reactor in the mobile short-circuit control unit.

* * * * *